United States Patent [19]

Cleve et al.

[11] Patent Number: 4,779,440

[45] Date of Patent: Oct. 25, 1988

[54] EXTRUSION TOOL FOR PRODUCING HARD-METAL OR CERAMIC DRILL BLANK

[75] Inventors: Peter Cleve, Essen; Alfons Lomberg, Bottrop, both of Fed. Rep. of Germany

[73] Assignee: Fried. Krupp Gesellschaft mit beschraenkter Haftung, Essen, Fed. Rep. of Germany

[21] Appl. No.: 924,873

[22] Filed: Oct. 30, 1986

[30] Foreign Application Priority Data

Oct. 31, 1985 [DE] Fed. Rep. of Germany ....... 3538758
Jan. 13, 1986 [DE] Fed. Rep. of Germany ....... 3600681
Jun. 10, 1986 [EP] European Pat. Off. ........... 86107888

[51] Int. Cl.$^4$ ................... B21C 25/04; B21C 23/14
[52] U.S. Cl. ...................................... 72/260; 72/264; 72/269; 76/5 R; 76/108 T; 408/144
[58] Field of Search ............. 408/59, 144; 72/260, 72/264, 269, 467; 76/5 R, 108 R, 108 T

[56] References Cited

U.S. PATENT DOCUMENTS

| | | | |
|---|---|---|---|
| 1,325,301 | 12/1919 | Levy | 72/260 |
| 2,422,994 | 6/1947 | Taylor | 76/108 R |
| 2,859,869 | 11/1958 | Nolf | 72/467 |
| 2,954,121 | 9/1960 | Benson | 72/260 |
| 3,186,210 | 6/1965 | Lesher et al. | 72/260 |
| 3,242,712 | 3/1966 | Dalton | 72/260 |
| 3,267,712 | 8/1966 | Atkin | 72/260 |
| 3,555,935 | 1/1971 | Dorrenberg | 76/108 T |
| 4,059,031 | 11/1977 | Erdelyi | 72/264 |
| 4,704,055 | 11/1987 | Gühring | 408/59 |

FOREIGN PATENT DOCUMENTS

| | | | |
|---|---|---|---|
| 0118035A1 | 2/1984 | European Pat. Off. | 72/260 |
| 867446 | 10/1981 | U.S.S.R. | 72/264 |

*Primary Examiner*—Lowell A. Larson
*Attorney, Agent, or Firm*—Spencer & Frank

[57] ABSTRACT

An extruded drill blank which has uniform pitch of grooves or lands on the circumference thereof and flushing bores of uniform diameter. A tool and process for producing the extruded drill blank comprises heating a hard metal or ceramic material to the extrusion temperature thereof, pressing the heated metal or ceramic material through the space defined by a mandrel and a nozzle and twisting the blank helically during the extrusion, whereby the billet is guided in the direction of the extrusion by at least one land or groove extending helically and provided on the inside surface of the nozzle, and contemporaneously forming bores on the blank with at least one elastic center pin secured onto the mandrel and spaced apart by a spacing corresponding to the flushing bore; the mandrel terminating prior to the nozzle, and the center pin protruding into the nozzle interior and having a diameter corresponding to the diameter of the flushing bores.

13 Claims, 6 Drawing Sheets

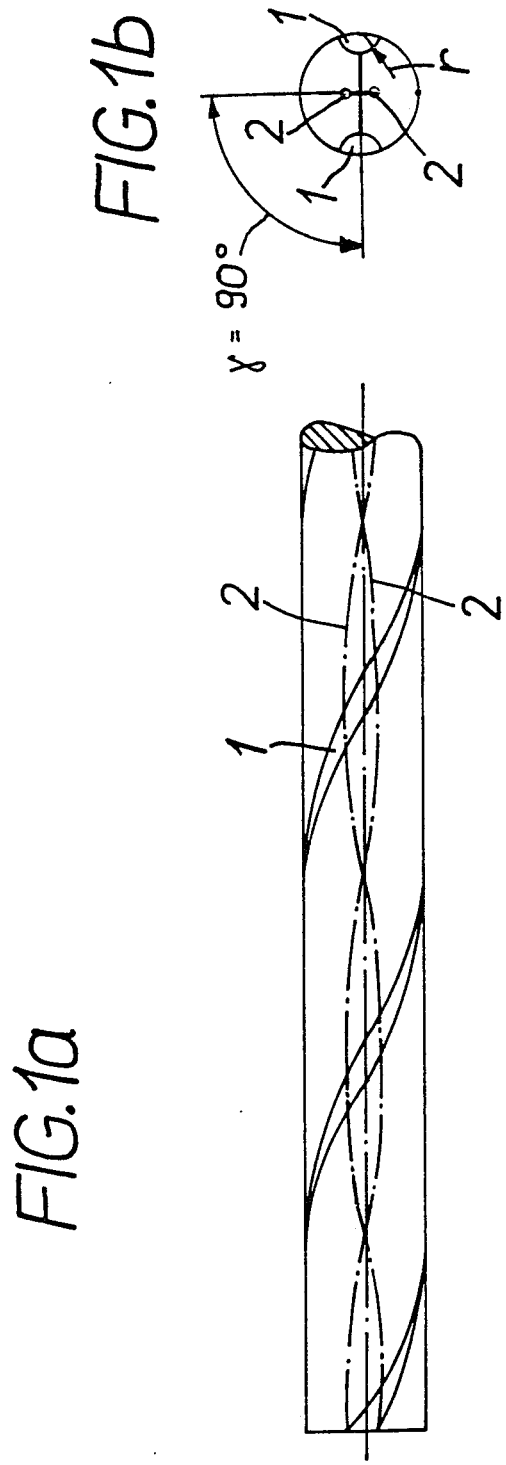
FIG.1a
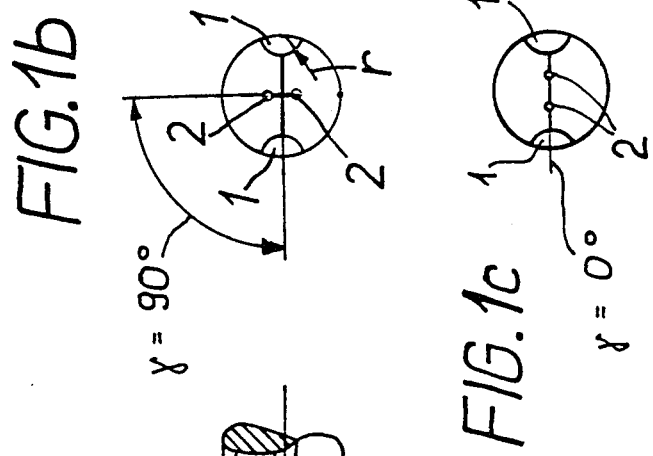
FIG.1b
FIG.1c

FIG.8a
FIG.8b
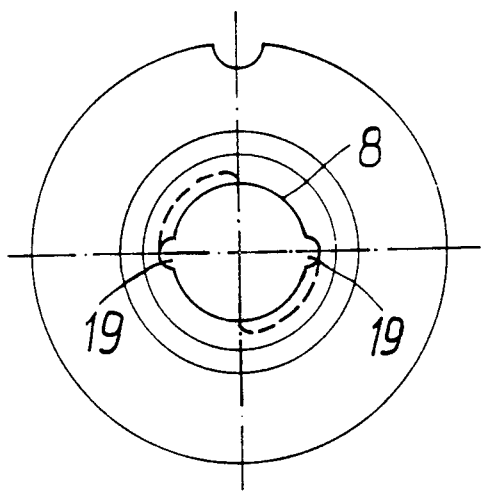
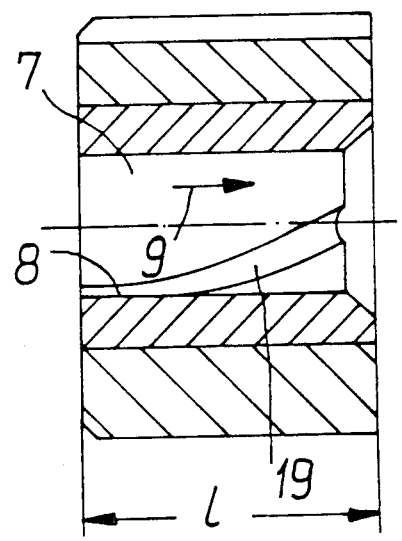

EXTRUSION TOOL FOR PRODUCING HARD-METAL OR CERAMIC DRILL BLANK

BACKGROUND OF THE INVENTION

1. Field of the Invention

The invention relates to a hard-metal or ceramic drill blank with at least one helically extending internal flushing bore, and to a method for producing the blank roughly comprising heating the hard-metal or ceramic material to its extrusion temperature, pressing the heated material through a space defined by a mandrel and a nozzle to helically twist the blank. This invention also relates to an extrusion tool for manufacturing the drill blank of the invention.

2. Description of the Prior Art

Extrusion processes and hard-metal or sintered drill blanks are known, e.g., from European patent application No. 0,118,035 A1. The blanks produced by means of helical twisting as described in this patent application still need to have chip spaces ground out. This involves not only a separate step but also considerable costs. To produce the hard-metal drill tip, this patent application proposes that a circular-cylindrical sintered metal blank be extruded by means of an extrusion device having an extrusion die nozzle.

The helically extending cooling conduits are then produced by twisting of the sintered metal blank emerging from the extrusion device with an angular speed adapted to the flow of material, the desired drill geometry and the helical course of the cooling conduits. The twisting devices provide a steady and uniform axial guidance of the sintered metal blank and an equally continuous and steady twisting movement.

Accordingly, the prior art method has the disadvantage of requiring not only an extrusion tool but also additional twisting devices and corresponding control and regulating devices.

SUMMARY OF THE INVENTION

It is accordingly an object of the invention to provide a hard-metal or ceramic blank in which the least possible grinding work, such as for knocking out the chip spaces, is required for processing it further to become a drill.

It is another object of the invention to provide also a method and an extrusion tool with which the blanks can be produced with an exactly uniform pitch and uniform flushing bore diameter while dispensing with additional operations and with twisting control and regulatin devices.

The above and other objects of the invention are attained by providing a hard-metal or ceramic drill blank having at least one helically extending flushing bore and at least one helical groove or land in a direction parallel to the flushing bore.

The above and other objects of the invention are also attained by providing a method for producing such hard-metal or ceramic drill blank, the method comprising heating a hard metal or ceramic billet to the extrusion temperature thereof;

extruding the billet to obtain the blank by pressing the heated billet through a space defined by a mandrel and a nozzle while helically twisting the material thereof and guiding the billet in the direction of extrusion by means of at least one helically extending land or at least one groove provided on the inside surface of the nozzle; and contemporaneously forming the bore on the blank with at least one elastic center pin secured onto the mandrel and protruding into and terminating prior to the nozzle interior and having a diameter of a desired flushing bore.

The objects according to the invention are further achieved by providing an extrusion tool for producing a drill blank comprising a mandrel and a nozzle, wherein the inside surface of the nozzle has at least one land or groove extending helically in the direction of extrusion and at least one elastic center pin is secured onto the mandrel and spaced apart by a spacing corresponding to the flushing bore; the mandrel terminating prior to the nozzle, and the center pin protruding into the nozzle interior and having a diameter corresponding to the diameter of the flushing bore.

DESCRIPTION OF THE INVENTION

In accordance with the above and other objects of the invention, a hard-meta or ceramic blank is provided herein in which the least possible grinding work, e.g., for knocking out chip spaces, is required for further processing to obtain a drill. A method and an extrusion tool are also provided with which the blank can be produced with an exactly uniform pitch and uniform flushing bore diameter while dispensing with additional operations and with twisting, control and regulating devices.

The helically disposed grooves serve as beginnings for the subsequent chip spaces of the drill. Thus, the chip spaces are largely formed in a manner such that only layers of insignificant thickness need to be removed. The drill blank can be produced in arbitrary lengths and can be cut to a length or lengths appropriate for the later drill tip as needed. To produce the drill, the finished drill tip can be joined to a holder element in a manner known in the art. The blanks according to the invention having a land or lands provide the advantage that a shaft portion can be produced by grinding off the land or lands and need not be attached as a separate part to the drill tip after ship spaces have been ground into the drill tip. The entire drill tip with the contiguous shaft can thus be produced in one single piece by purposeful grinding in of the chip spaces in the region that will later be the drill tip and by purposeful grinding of the land(s) in the region that will later become the shaft.

According to a further embodiment of the invention, the grooves or lands are disposed at an angle of from about 0° to 90° to the flushing bore(s). As such, the lines that connect the centers of the grooves and the centers of the flushing bore with one another in cross section may be either at right angles, at acute angles, or may extend in parallel to one another.

In the present invention, twisting and producing the flushing bores is attained in one operation along with extrusion itself, instead of twisting the sintered drill blank only after it emerges from the extrusion apparatus as proposed in the prior art. The elastic center pins provided on the mandrel of the extrusion tool start by creating flushing bores during the twisting. These bores have diameters corresponding to those of the elastic center pins of the mandrel. The uniform geometry of the flushing bores is not destroyed by later operations. The twisting is effected by the guide land(s) or the guide groove(s) simultaneously while extruding. Accordingly, the twisting no longer depends on secondary factors such as the flow speed of the material in the extruder.

A uniform pitch of the hard-metal or ceramic drill blank is always imparted regardless of the speed with which the die pushes the material into and through the nozzle. The extent of the pitch of the groove(s) or land(s) of the blank preferably determines the pitch of the chip space and, whereas it may vary from one drill type to another, it can in an extreme case even change to straight groove(s). All that need to be done is to change the nozzle in order to produce blanks with a different land or groove pitch or with some other diameter. However, this can be attained by working with the same method or the same extrusion tool. No other adjustment or regulation need to be undertaken. The uniformity of the pitch is increased further if the guidance is effected over the above-mentioned land helix over an angle of at least about 90°, and preferably over at least 180°. The maximum angle is 360°.

For technical reasons having to do with equipment, manufacturing considerations and methods, a guide, i.e., the land or the groove, which has a semicircular cross-section and a radius of at least 0.2 mm and maximum 1 mm is preferred.

The area has at least 0,12 mm² up to 1 mm², preferably 0,28 mm².

Tests have shown that the spiral angle of the helical land, or the groove in the nozzle, should be selected to be somewhat larger than the angle desired in the blank. Preferably, the overmeasure amounts to approximately 3° to 7°.

If the center pins are supported by spacers up to the level of the nozzle inlet space, the uniformity of the parallel course with respect to one another or to the surrounding groove or land is advantageously greater.

The center pin should be elastic so that it will withstand without breaking the twisting which it necessarily undergoes when the hard-metal or ceramic extrusion batch is twisted. A copper or nonferrous metal alloy, iron and/or an iron alloy and/or a lightweight metal of aluminum or a lightweight metal alloy and/or a plastic, e.g., polyamide, is preferably used for the center pin. In a further embodiment of the invention, a polyamide coating is recommended if the center pin or pins are made of metal.

Depending on the intended use of the drill that is finally to be made from the blank, it may be useful to provide flushing bores having various diameters. For this purpose, a mandrel with correspondingly dimensioned center pins should be used.

In order to attain good flowability of the material to be extruded, the mandrel is preferably tapered in substantially conical fashion on the end oriented toward the nozzle so that the elastic center pins emerge at the cone surface. The conical shape may terminate in a point or can change into a substantially cylindrical spacer for supporting the center pins.

The extrusion tool according to the invention has a (changeable) nozzle having at least one land or groove extending helically in the extrusion direction. The extrusion tool also has a mandrel that terminates before the interior of the nozzle having one or more elastic center pins having the desired diameter of the flushing bore secured onto the mandrel. The center pins are secured onto the end of the mandrel and oriented toward the nozzle at intervals that the thereby producible flushing bores need be located, and they protrude into the interior of the nozzle. Preferably, they protrude as far as the end of the nozzle interior or even about 1 to 2 mm beyond it. Groove or land helixes can be used which in a projection would describe an angle of more than 90°, and preferably more than 180°. Advantageously, the extrusion tool has a design as simple as that of previously known tools but dispenes with the (additional) twisting devices otherwise required for the extrusion tool. For reasons having to do with the manufacturing technology, the groove or land geometry described hereinabove is highly recommended.

A more complete appreciation of the invention and many of the attendant advantages thereof will be readily perceived as the same becomes better understood by reference to the following detailed description when considered in connection with the accompanying figures.

DESCRIPTION OF THE DRAWINGS

FIGS. 1a and 1b are, respectively, a longitudinal view and a cross-sectional end view of a drill blank with a groove cut into it and with flushing bores.

FIG. 1c is a cross-sectional view of the drill blank of FIG. 1a.

FIGS. 8a and 8b are, respectively, a cross-sectional view and a longitudinal section view of a nozzle having a helical groove.

Other objects, advantages and features of the present invention will become apparent to those skilled in the art from the following discussion.

DESCRIPTION OF THE INVENTION WITH REFERENCE TO THE DRAWINGS

The hard-metal drill blank shown in FIGS. 1a and 1b has two helical grooves 1 extending around it with a semicircular wall and a radius r of 1 mm. The grooves are "pre-formed" chip spaces which will later be completely ground out to produce the drill tip. The hard-metal drill blank has two flushing bores 2, e.g., having a diameter of 0.8 mm, which extend parallel to the grooves 1. The connecting line of the grooves 1 and that of the flushing bores 2 in FIGS. 1a and 1b are at an angle J=90°, whereas in FIG. 1c an embodiment is shown having an angle j=0°. Any angle value between the two angles values dipected in FIGS. 1a, 1b and 2 is also possible as well as an eccentric arrangement in which both flushing bores are located on the same side of an imaginary cross-sectional center line.

A suitably long piece is cut off from the drill blank in order to form the drill tip, the chip spaces or cutting lands are then ground in and the drill tip is ground at the surface where the two flushing bores end.

Figure 2:
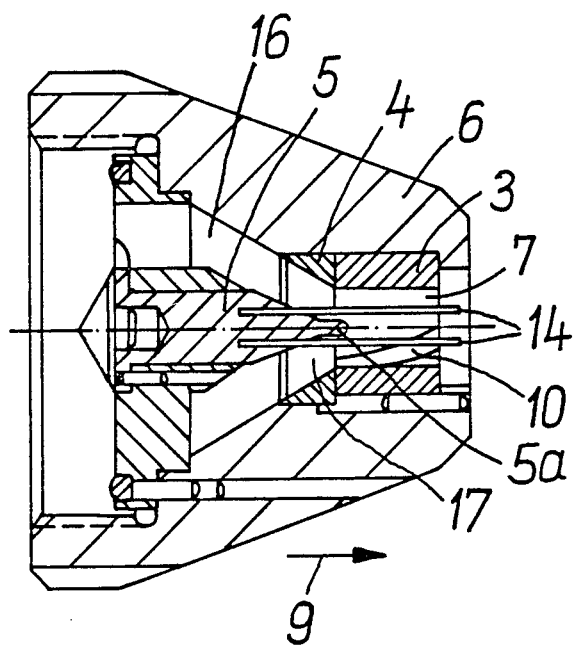
FIG. 2 is a cross-sectional view of an extrusion tool.
Figure 5A:
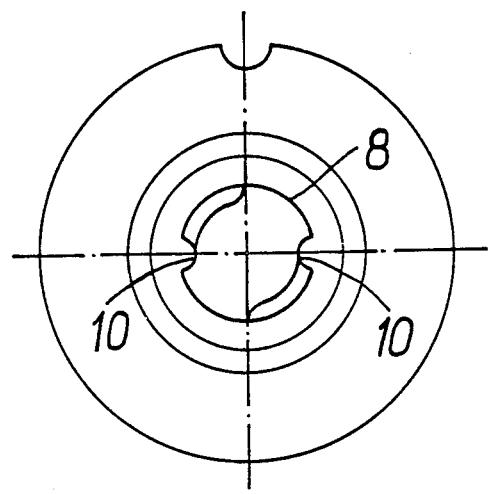
FIGS. 5a and 5b are, respectively, a cross-sectional end view and a cross-longitudinal view of a nozzle with a helical land.
Figure 5B:
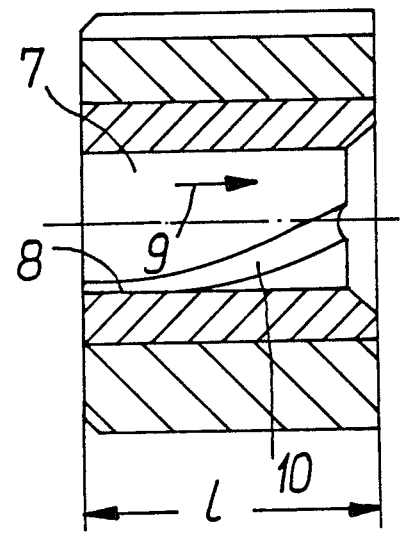
Figure 6:
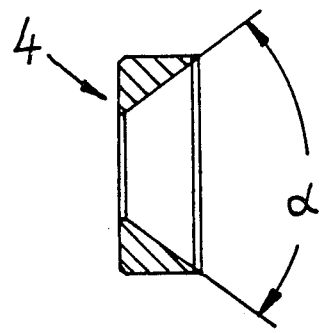
FIG. 6 is a cross-sectional view of an inlet nozzle that can be disposed ahead of the nozzle of FIG. 5.

FIG. 2 shows an extrusion tool according to the invention. The extrusion tool substantially comprises a nozzle 3, an inlet nozzle 4 preceding the nozzle 3, a mandrel 5 and a nozzle socket 6. The nozzle 3 is shown in further detail in FIGS. 5a and 5b and the inlet nozzle 4 is shown in detail in FIG. 6. The nozzle 3 comprises a cylindrical ring with a cylindrical nozzle interior 7 defined by the inside surface 8. The inside surface 8 of the nozzle 3 has two lands 10 extending helically in the extrusion direction 9 which over the length 1 of the nozzle describe a quarter-circle (90°). The lands have a semicircular cross-section and a radius of at least 1 mm. The nozzle 3 shown in FIGS. 5a and 5b is preceded by the inlet nozzle 4 shown in FIG. 6. The inlet nozzle has a conical inlet funnel for the material to be extruded. The smallest radius of the inlet funnel is approximately equal to the radius of the inlet nozzle and the cone angle α of the inlet funnel is approximately 70°.

Figure 3:
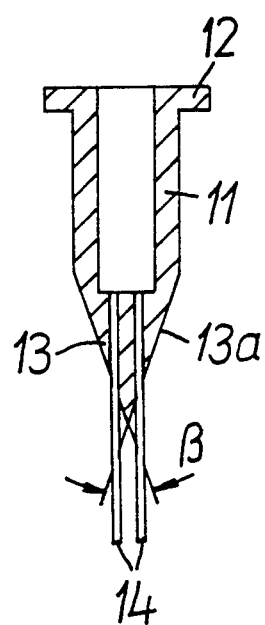
FIG. 3 is a sectional view through a conical mandrel.
Figure 4:
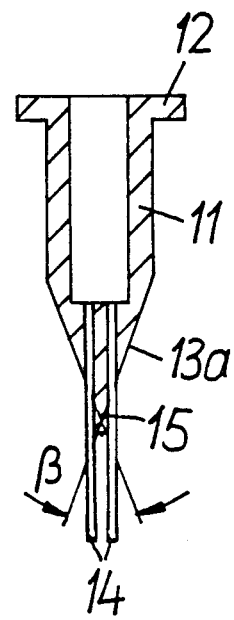
FIG. 4 is a view corresponding to FIG. 3 of a mandrel having a cylindrical spacer.

The mandrel 5 depicted in FIG. 2 is axially centered with respect to the inlet nozzle 4 and the nozzle 3, and its tip 5a is located approximately just before the nozzle interior 7. By way of example, the mandrel 5 has the shape shown in FIGS. 3 and 4. The mandrel has a cylinder 11, a base 12 and either a cone 13 from where the center pins 14 emerge from the conical surface 13a parallel to the extrusion direction, or the mandrel tip 5a terminates in a cylindrical spacer 15, which is disposed such that the center pins 14 emerging parallel from the (frusto)conical surface 13a rest on the spacer. A preferred conical surface angle β is in the range of 40°.

The above-mentioned elements are housed in a nozzle socket 6 (FIG. 2) in a manner known from the prior art.

The method according to the invention is performed as follows.

A hard-metal block is pressed by a press member (not shown in FIG. 2) in the direction of the arrow 9 and into the space 16 defined between the mandrel 5 and the nozzle socket 6. Thereafter, and due to the continued movement of the press member the hard metal is pressed into the space 17 in the inlet nozzle 4 where it is compressed. The actual shaping process is completed in the nozzle interior 7 in two ways. During the further advancement of the press member, the hard metal is given its cylindrical form. This is done in a manner such that toward the circumference the lands 10 generate a helically extending groove in the hard-metal billet and at the same time set the billet extruded from the nozzle 3 into rotation about its longitudinal center axis. As a result of this rotation, the center pins protruding through the nozzle interior do not leave behind cylindrical holes corresponding to the wire diameter as would be the case with a non-rotating billet. Instead, the elastic center pins 14 are likewise twisted helically and each generates a correspondingly helically extending flushing bore 2 parallel to the grooves 1. The spacing of the center pins 14 from one another defines the correspondingly spacing of the flushing bores extending parallel to one another.

Figure 7A:
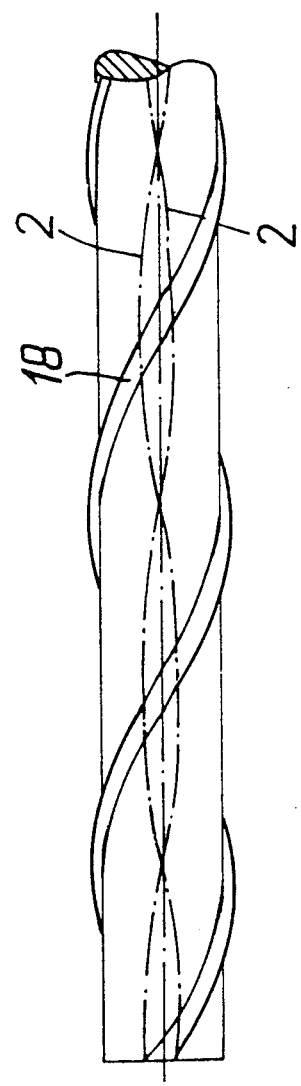
FIGS. 7a and 7b are, respectively, a longitudinal view and a cross-sectional view of a drill blank with a land and flushing bores.
Figure 7B:
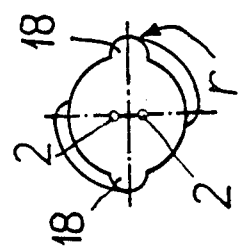

The hard-metal drill blank shown in FIG. 7a has two lands 18 extending helically around it and a wall of semicircular cross-section with a radius r of 1 mm. In all other aspects, the hard-metal drill blank corresponds to that shown and described in connection with FIGS. 1a and 1b.

FIGS. 8a and 8b show an inlet nozzle which, unlike the nozzle shown in FIGS. 5a and 5b described above, has an inside nozzle jacket surface 8. The inside nozzle jacket surface 8 has two grooves 19 extending helically in the direction of extrusion 9 which over the nozzle length l describe a quarter-circle (90°).

In an example the following dimensions were chosen:

| | | |
|---|---|---|
| hardmetal drill blank outside diameter and nozzle inside diameter | both | 8,3 mm |
| helical groove radius | | 0,6 mm |
| diameter of the circle, upon which the flushing bores are | | 4,5 mm |
| flushing bore diameter | | 0,9 mm |
| diameter of the elastic center pin | | 0,9 mm |
| guidance over land helix or groove over | | 180° |
| temperature of the hardmetal | | 30° C. | the size of the die depends on the extrusion tool for example a die-diameter is 80 mm.

The invention now being fully described, it will be apparent to one of ordinary skill in the art that many changes and modifications can be made thereto without departing from the spirit or scope of the invention as set forth herein.

What is claimed is:

1. An extrusion tool for producing a drill blank having an interior flushing bore and a helical groove or land at its outer surface, comprising
    a mandrel, and
    a nozzle having an inlet end and a central axis extending parallel to the direction of extrusion, wherein: the inside surface of the nozzle has at least one land or groove extending helically in the direction of extrusion for twisting the billet as it passes through said nozzle while forming the helical groove or land of the drill blank, and said tool further comprises at least one elastic center pin secured onto the mandrel and extending parallel to and spaced from the central axis of said nozzle and located for forming the flushing bore; said elastic center pin having an elasticity such that, during production of a drill blank, said elastic center pin is twisted helically about the central axis of the nozzle and generates a correspondingly helically extending flushing bore; said mandrel terminating prior to the inlet end of said nozzle, and said center pin protruding into the nozzle interior and having a diameter corresponding to the diameter of the flushing bore.

2. The extrusion tool of claim 1, wherein
    the nozzle length is selected to be at least long enough that the nozzle land or groove describes a helix of more than about 90°.

3. The extrusion tool of claim 2, wherein
    the nozzle land or groove described a helix of more than about 180°.

4. The extrusion tool of claim 1, wherein
    the land or the groove has a semicircular cross-section, and a radius (r) of at least about 0.2 mm.

5. The extrusion tool of claim 1, wherein
    the center pin is made of a material selected from the group consisting of a copper alloy or a non-ferrous metal alloy.

6. The extrusion tool of claim 5, wherein
    the center pin is made of a material selected from the group consisting of a metal, a metal alloy and mixtures thereof, and is coated with a polyamide.

7. The extrusion tool of claim 1, wherein
    the pin is made of a material selected from the group consisting of
    a copper alloy,
    iron or an iron alloy,
    a lightweight metal,
    a lightweight metal alloy,
    plastic, and mixtures thereof.
8. The extrusion tool of claim 7, wherein the lightweight metal alloy is a lightweight aluminum alloy.
9. The extrusion tool of claim 7, wherein the plastic of the center pin is a polyamide.
10. The extrusion tool of claim 1, wherein there are two center pins having different diameters.
11. The extrusion tool of claim 1, wherein the mandrel is tapered in substantially conical fashion on the end oriented toward the nozzle, and the center pin emerges from the conical surface.
12. The extrusion tool of claim 11, wherein the conical tapering changes into a substantially cylindrical spacer for supporting the center pin.
13. The extension tool of claim 1 wherein said nozzle has an outlet end and said center pin extends at least to said outlet end.

* * * * *